(12) United States Patent
Rossetti et al.

(10) Patent No.: US 9,143,829 B2
(45) Date of Patent: *Sep. 22, 2015

(54) TECHNIQUE FOR PROVIDING A VIRTUAL DIGITAL VIDEO RECORDER SERVICE THROUGH A COMMUNICATIONS NETWORK

(71) Applicant: Time Warner Cable Enterprises LLC, New York, NY (US)

(72) Inventors: Carl U. J. Rossetti, Hilton Head Island, SC (US); Michael L. LaJoie, Stamford, CT (US); Michael T. Hayashi, Evergreen, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 161 days.

This patent is subject to a terminal disclaimer.

(21) Appl. No.: 13/710,095

(22) Filed: Dec. 10, 2012

(65) Prior Publication Data
US 2013/0104176 A1    Apr. 25, 2013

Related U.S. Application Data

(63) Continuation of application No. 12/313,628, filed on Nov. 21, 2008, now Pat. No. 8,331,768, which is a continuation of application No. 10/626,051, filed on Jul. 24, 2003, now Pat. No. 7,457,520.

(51) Int. Cl.
*H04N 5/91* (2006.01)
*H04N 21/45* (2011.01)
*H04N 5/782* (2006.01)
(Continued)

(52) U.S. Cl.
CPC ........... *H04N 21/4508* (2013.01); *H04N 5/782* (2013.01); *H04N 7/17336* (2013.01); *H04N 21/234381* (2013.01); *H04N 21/2408* (2013.01); *H04N 21/25891* (2013.01);
(Continued)

(58) Field of Classification Search
CPC ........................... H04N 5/782; H04N 7/17336
USPC .......................... 386/200, 291, 297, 294, 299
See application file for complete search history.

(56) References Cited

U.S. PATENT DOCUMENTS 5,371,551 A     12/1994   Logan et al.
5,541,738 A  *   7/1996   Mankovitz .................... 386/245
(Continued)

FOREIGN PATENT DOCUMENTS

JP         20020335507        11/2002
WO         WO 01/56285         8/2001

*Primary Examiner* — Robert Chevalier
(74) *Attorney, Agent, or Firm* — Cozen O'Connor; Brandon N. Sklar

(57) ABSTRACT

In response to a request initiated by a user at a user terminal, selected entertainment programming content, when broadcast, is recorded at a location remote from the user terminal. The request is communicated through a communications network, e.g., cable TV network, which is also used for transmission of entertainment programming content to user terminals. The recorded programming content is stored in a storage space at the remote location, which is allocated to the user terminal. In response to a review request from the user terminal, the recorded programming content is retrieved from the storage space allocated thereto, and transmitted to the user terminal through the communications network. The presentation of the recorded programming content may be manipulated by the user to perform rewinding, pausing and fast-forwarding thereon.

54 Claims, 3 Drawing Sheets

(51) Int. Cl.
| | |
|---|---|
| *H04N 7/173* | (2011.01) |
| *H04N 21/2343* | (2011.01) |
| *H04N 21/24* | (2011.01) |
| *H04N 21/258* | (2011.01) |
| *H04N 21/2747* | (2011.01) |
| *H04N 21/472* | (2011.01) |
| *H04N 21/482* | (2011.01) |
| *H04N 21/6587* | (2011.01) |

(52) U.S. Cl.
CPC .... *H04N 21/2747* (2013.01); *H04N 21/47214* (2013.01); *H04N 21/482* (2013.01); *H04N 21/6587* (2013.01)

(56) References Cited

U.S. PATENT DOCUMENTS

| | | | |
|---|---|---|---|
| 6,233,389 | B1 | 5/2001 | Barton et al. |
| 6,324,338 | B1 | 11/2001 | Wood et al. |
| 7,058,810 | B2 | 6/2006 | Kumazawa et al. |
| 7,457,520 | B2 | 11/2008 | Rossetti et al. |
| 7,908,626 | B2 | 3/2011 | Williamson et al. |
| 8,584,182 | B2 | 11/2013 | Berberet et al. |
| 2002/0049800 | A1 | 4/2002 | Kobayashi et al. |
| 2003/0149988 | A1 | 8/2003 | Ellis et al. |

\* cited by examiner

100

200

400

700

TECHNIQUE FOR PROVIDING A VIRTUAL DIGITAL VIDEO RECORDER SERVICE THROUGH A COMMUNICATIONS NETWORK

RELATED APPLICATIONS

This application is a continuation of U.S. application Ser. No. 12/313,628, which was filed on Nov. 21, 2008 and will issue on Dec. 11, 2012 bearing U.S. Pat. No. 8,331,768, which is a continuation of U.S. application Ser. No. 10/626,051, filed Jul. 24, 2003, which issued on Nov. 25, 2008 bearing U.S. Pat. No. 7,457,520 B2, both of which are incorporated by reference herein.

FIELD OF THE INVENTION

The invention relates to communications systems and methods, and more particularly to a system and method for delivering information and entertainment programs through a communications network, e.g., a cable network.

BACKGROUND OF THE INVENTION

Broadcast of entertainment programming content, e.g., TV programs, over broadband communications networks, such as cable networks, is well known. However, to free a user from the traditional constraint of a broadcast schedule, the cable network may also provide the user with video-on-demand (VOD) services, e.g., movie-on-demand (MOD) service, subscription VOD (SVOD) service, etc., which allow the user to access selected programming content on an on-demand basis. In addition, the VOD services allow the user to manipulate (e.g., rewind, pause and fast-forward) a VOD presentation to enhance his/her enjoyment. However, the collection of VOD programs from which the user may select is typically compiled by the VOD service provider. Because the user has no input to the compilation of the VOD programs, the user at times may not find any program in the collection to his/her personal liking.

Personalized recording may be a solution to the above-identified VOD service deficiency, which may be achieved using a digital video recorder (DVR), also known as a personal video recorder (PVR), e.g., TiVo or ReplayTV device. A DVR allows a user to record his/her favorite TV programs for later review, and exercise a season-pass-like option to record every episode of his/her favorite program for a period. It may automatically record programs for the user based on his/her viewing habit and preferences. It also automatically records the last X minutes of programming content played on the channel to which the user actually tunes, where X represents a predetermined value. The presentation of the recorded programming content can be manipulated by exercising rewind, pause and fast-forward functions as well. In addition, some DVRs may provide a "commercial skip" feature or the like, enabling the user to conveniently skip commercials when viewing recorded programming content.

Examples of prior art DVRs are described in U.S. Pat. No. 5,371,551 issued to Logan et al. (the '551 patent), U.S. Pat. No. 6,233,389 issued to Barton et al. (the '389 patent) and U.S. Pat. No. 6,324,338 (the '338 patent) issued to Wood et al. The '551 patent describes a DVR employing a "circular buffer" which constantly records one or more incoming audio or video programs. Incoming analog broadcast programs are digitized and compressed prior to storage in the buffer, then decompressed and converted back into analog form for playback.

The '389 patent describes a DVR which allows a user to store selected television broadcast programs while the user is watching or reviewing another program. The program data is compressed pursuant to an MPEG standard and separated into video and audio components for storage.

The '338 patent describes a DVR having integrated channel guides allowing a user to control recording and storage of television programs into personal channels for later playback and viewing. In the event that the storage overflows, preexisting stored programs are deleted based on their predetermined priority to make room for new programs.

SUMMARY OF THE INVENTION

The designers of the prior art DVRs described above share a major concern, which is how to effectively manage the limited storage capacity of a DVR to accommodate conceivably unlimited programming content recorded by a user. In fact, to improve its storage capacity and other functionalities over time, a user of a prior art DVR is faced with continual hardware and software upgrades of the DVR, which prove to be time-consuming and costly.

The invention overcomes the prior art limitations by recording programs at a remote location from the user premises, e.g., a headend of a cable network, thereby allowing a user to record a virtually unlimited number of programs (perhaps subject to a fee schedule) and, at a minimum, to be relieved of the burden of any storage or other system upgrades, which is removed to the network operator.

Thus, in accordance with an embodiment of the invention, a server at the remote location is receptive to a request from a user terminal for recording selected programming content. In response to such a request, the server copies the selected programming content during broadcast thereof. The resulting copy is used for providing the selected programming content through the cable network after broadcast thereof. In an illustrative embodiment of the invention, the copy of the selected programming content is stored at the remote location in a storage space associated with the user terminal. This storage space may be identified by an identifier of the user terminal.

It should be noted that embodiments of the invention embrace a concept very different from that of a network personal video recorder (NPVR) service, which is described, e.g., in copending commonly assigned application Ser. No. 10/263,015, filed on Oct. 2, 2002, which issued on Mar. 15, 2011 bearing U.S. Pat. No. 7,908,626, which is hereby incorporated by reference. In accordance with the NPVR service, broadcast programs are copied at a headend of a cable network before they are delivered to a user at a user terminal. The user may "reserve", for later review, not only in-progress programs and future programs, but also previously broadcast programs since they have been copied at the headend regardless of any user request. In addition, in the NPVR service the copy of broadcast programs, serving as a master copy, is shared among the user terminals which reserved the programs. By contrast, in accordance with the invention, selected broadcast programs are recorded in response to a user request. The resulting copy of the programs is stored in a storage space associated with the user terminal for its exclusive use.

BRIEF DESCRIPTION OF THE DRAWINGS

Further objects, features and advantages of the invention will become apparent from the following detailed description taken in conjunction with the accompanying drawings showing illustrative embodiments of the invention, in which.

DETAILED DESCRIPTION

The invention is directed to providing information and entertainment programming content over a digital two-way multichannel broadband communications network, such as a cable TV network. It will be appreciated that the invention may also be deployed in other communications systems, such as a direct broadcast satellite (DBS) system especially when its two-way communications capability is realizable. In accordance with the invention, a user may utilize a "virtual" digital video recorder (VDVR), whose functions are delivered as a service to the user through the communications network, to control the content of programs to be recorded and reviewed. By replacing a prior art DVR at a user location with the VDVR service, the user, at a minimum, is relieved of the burden of any system maintenance or storage upgrade typical of a prior art DVR, which is removed to the network operator.

Like a prior art DVR presentation, a VDVR presentation here may be manipulated to perform rewinding, pausing and fast-forwarding thereon. A user may exercise VDVR functions by pressing designated keys on a remote control associated with a set-top terminal.

Figure 1:
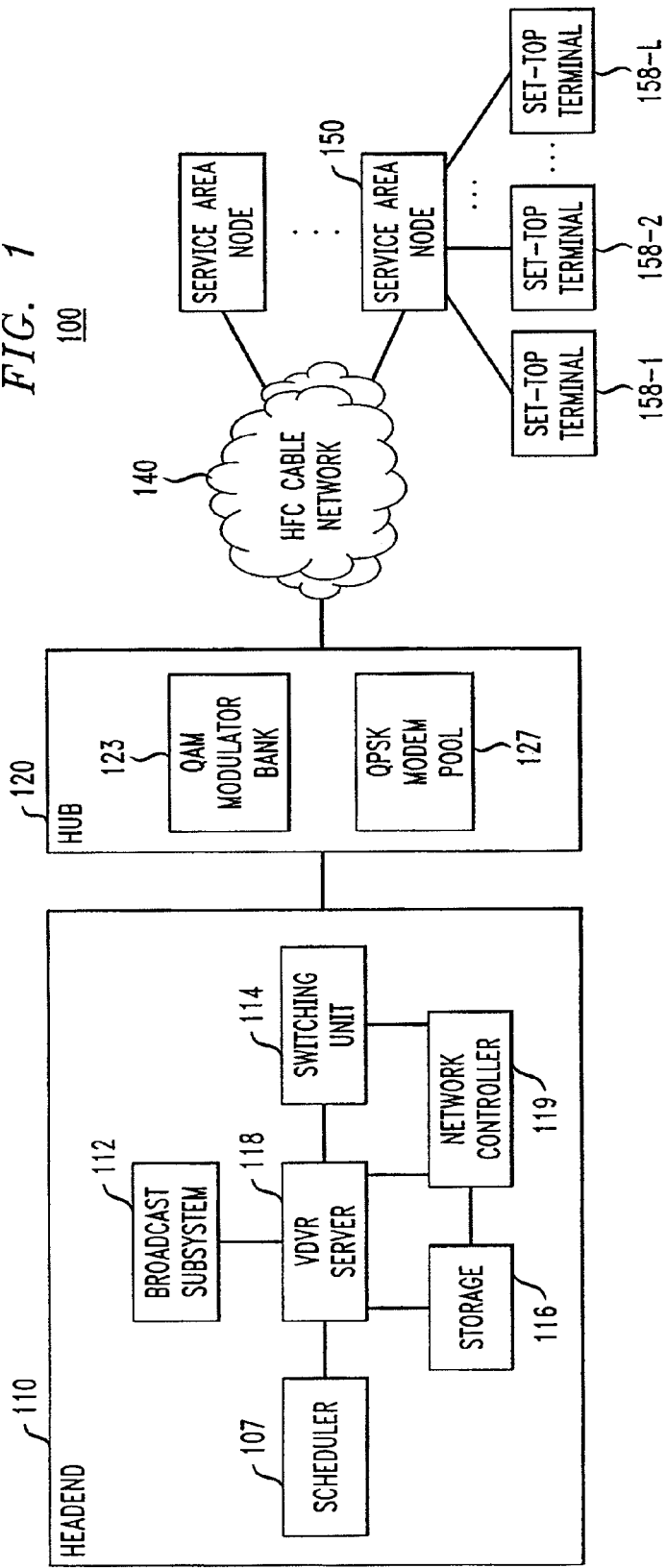
FIG. 1 is a block diagram of a broadband communications system in accordance with the invention.

FIG. 1 illustrates broadband communications system 100 embodying the principles of the invention for providing information and programming content to set-top terminals on users' premises. As shown in FIG. 1, system 100 includes headend 110, hub 120, hybrid fiber coaxial (HFC) cable network 140, and service area node 150 which is connected to set-top terminals 158-1 through 158-L in a neighborhood, where L represents a predetermined number.

Headend 110 includes broadcast subsystem 112 which receives a composite program stream containing programming content from various content providers and sources, e.g., analog and digital satellite sources, application servers, media servers, etc. In a conventional manner, the received composite program stream is processed by subsystem 112, resulting in transport streams. In this illustrative embodiment, the transport streams are fed through VDVR server 118 to switching unit 114. The latter switches the received transport streams to appropriate modulators in hub 120 to broadcast the programming content to users through HFC cable network 140. At the same time, VDVR server 118 copies portions of the transport streams corresponding to the programming content which users requested to record, in accordance with the invention.

Figure 2:
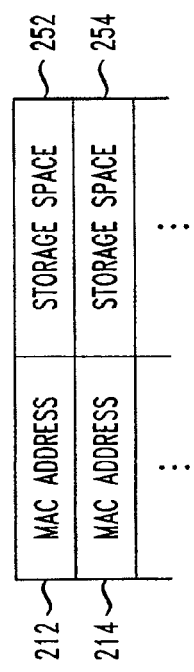
FIG. 2 illustrates a memory map associating different set-top terminals with storage spaces for storing programming content in accordance with the invention.

Thus, among other things, server 118 selectively copies portions of the transport streams into storage 116, which may include one or more hard drives, caches, disks or other memory devices, in response to users' earlier recording requests. FIG. 2 illustrates memory map 200 of storage 116, wherein the storage space is partitioned on a set-top terminal by set-top terminal basis. Each set-top terminal is identified by a network address (e.g., a media access control (MAC) address or an Internet protocol (IP) address) assigned thereto. As shown in FIG. 2, memory map 200, which in this instance is stored in server 118, indicates that the set-top terminal, say, 158-1, having MAC address 212 is allocated storage space 252 in storage 116, identified by a range of memory addresses (e.g., from memory address 13000000 to 14FFFFFF (hexadecimal)); the set top terminal, say, 158-2, having MAC address 214 is allocated storage space 254 in storage 116; and so on and so forth. It should be noted that the storage spaces allocated to the individual set-top terminals may or may not be contiguous, and may be located in different memory devices. Based on memory map 200, server 118 stores recorded materials in storage spaces 252, 254, . . . for the users at terminals 158-1, 158-2, . . . , respectively. The interactivity between server 118 and set-top terminals to effect recording materials for the respective users is fully described below.

When server 118 is requested to serve certain recorded material to a user, say, at terminal 158-1, server 118 retrieves the requested material from storage space 202 associated with terminal 158-1. Server 118 also performs such well known VOD functions as providing a program stream containing the requested material for transmission to terminal 158-1. In this instance, the program stream is transmitted through a transmission channel having a specified frequency band. It should be noted that the term "transmission channel" should not be confused with a "program channel." A "transmission channel" signifies a designated frequency band through which a program stream is transmitted. On the other hand, a "program channel" signifies the source of the program material selected by a user to view. For example, a user may select program channel 2 to view program material provided by CBS, program channel 14 to view program material provided by ESPN; program channel 32 to view program material provided by MTV, etc. In this illustrative embodiment, the transmission channels may be 6 MHz bands populating a forward passband, e.g., 350-750 MHz band, of a coaxial cable, which is allocated for downstream communication from headend 110 to a set-top terminal.

Figure 3:
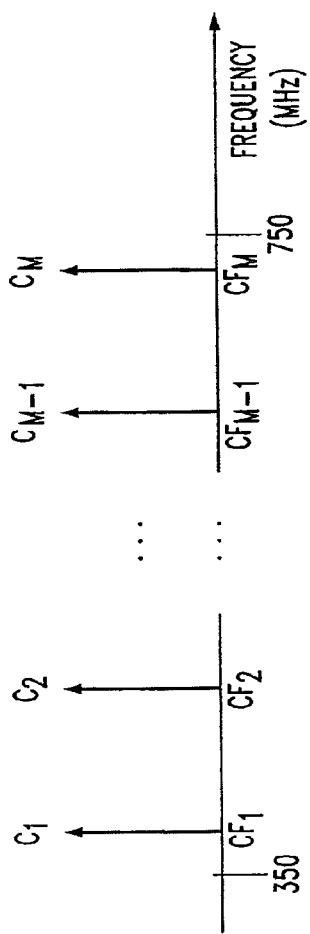
FIG. 3 illustrates selected carriers for transmitting information and program materials in a forward passband of the system of FIG. 1.

QAM modulator bank 123 in this instance is located in hub 120 connected to headend 105 via IP transport on the one hand and to HFC cable network 140 on the other hand. Bank 123 includes multiple modulators, each of which is used to modulate transport streams onto different carriers. Each modulated carrier carrying a transport stream is transmitted through a transmission channel associated therewith. FIG. 3 illustrates M carriers, $C_1$ through $C_M$, associated with M transmission channels in the forward passband. As shown in FIG. 3, the carrier frequency of $C_1$ is denoted $CF_1$; the carrier frequency of $C_2$ is denoted $CF_2$; . . . ; and the carrier frequency of $C_M$ is denoted $CF_M$. In this example, each program stream may contain 4.2 Mb/s video and audio recorded material. By using a 256-quadrature-amplitude-modulation (256-QAM) technique and 6 MHz transmission channel, each modulator in modulator bank 123 in this instance may modulate 9 or more program streams, multiplexed in a transport stream, onto the corresponding carrier. The resulting modulated carrier is transmitted through the transmission channel associated with the carrier.

Upstream data from a set-top terminal to headend 110 is communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and components of headend 110 are identified by the IP addresses assigned thereto. However, these IP addresses may be randomly assigned each time when system 100 is reconfigured. As a result, for example, the IP address of a set-top terminal may change after a system reconfiguration. Nevertheless, each set-top terminal is also assigned the aforementioned MAC address on a permanent basis, surviving any system reconfiguration.

Downstream data from headend 110 to a set-top terminal is communicated via forward data channels (FDCs). These channels, often referred to as "out-of-band" channels, may occupy the 70-130 MHz band of a coaxial cable. QPSK signals containing system messages to a set-top terminal are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

Scheduler 107 receives programming schedule data from an electronic program guide (EPG) server (not shown). The programming schedule data includes, for each program scheduled to broadcast, a program identification code identifying the program, and the broadcast start time (indicating date, hour and minute) thereof. It suffices to know for now that, with the programming schedule data, scheduler 107 helps server 118 to correctly identify and record the programs desired by a user. To that end, the same programming schedule data is provided to set-top terminals, e.g., terminals 158-1 through 158-L, for them to generate an interactive program guide (IPG), displayable on the associated TV sets (not shown). The methodology whereby the programming schedule data is provided to a set-top terminal from a headend is well known for which one may refer, e.g., to copending, commonly assigned U.S. application Ser. No. 10/390,863, filed on Mar. 18, 2003. In particular, the IPG in this instance facilitates a user to select therefrom broadcast programs to be recorded.

Figure 4:
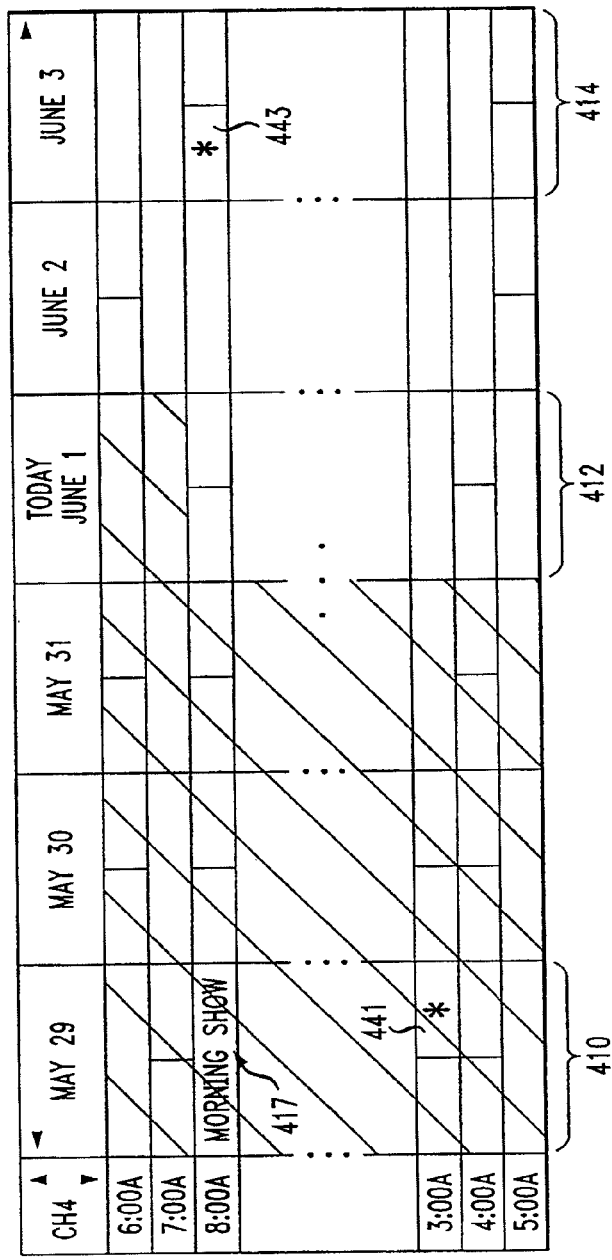
FIG. 4 illustrates a program guide for selecting programs to be recorded in accordance with the invention.

FIG. 4 provides a view of one such IPG identifying programming accessible to a user who is afforded the VDVR service in accordance with the invention. FIG. 4 illustrates IPG 400 for a particular program channel (e.g., channel 4) selected by the user pressing a designated key (e.g., "guide" key) on a remote control (not shown) whose signals are receptive by the associated set-top terminal. However, IPG 400 may be scrollable (up and down) to view listings of programming for other program channels as well. Without loss of generality, the channel 4 programming for each day is listed in IPG 400 in a column associated therewith, e.g., in this instance column 410 associated with May 29 which is in the past, column 412 associated with June 1 which is today's date, column 414 associated with June 3 which is in the future, etc. In each column, time slots, e.g., time slot 417, are shown which correspond to programs scheduled to broadcast. For example, a "Morning Show" program is listed in time slot 417 spanning from 8:00 am to 9:00 am. Other time slots in IPG 400 are similarly filled with program listings corresponding thereto (although they are shown blank here to facilitate the illustration). It should be noted that IPG 400 may also be scrollable (left and right) to view listings of the programming for other past and future dates as well.

In this instance, all of the programs listed in IPG 400, except the shaded programs which are in the past, are recordable. Thus, the user may record any unshaded program listed in IPG 400 by selecting (or highlighting) its listing, followed by pressing a "record" key on the remote control. The recorded programs in this instance are indicated by "*" in IPG 400. Thus, in this example program 441 was recorded as it was broadcast in the past, and program 443 is to be recorded when it is broadcast in the future. Advantageously, with IPG 400, the user can readily identify and record those desired programs for later review.

Figure 5:
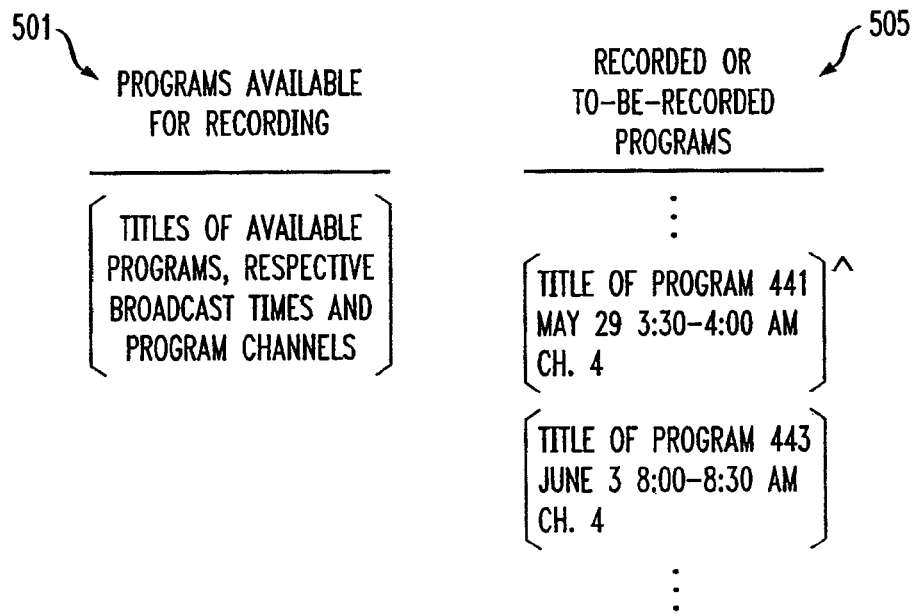
FIG. 5 illustrates an alternate format to the program guide of FIG. 4.

It will be appreciated that one skilled in the art would be able to devise other formats to identify, to a user, those programs which are available for recording, and those which have been recorded or requested to be recorded. For example, referring to FIG. 5, a user may be provided with, instead of IPG 400, two program lists jointly conveying similar information to IPG 400. As shown in FIG. 5, a first program list, denoted 501, identifies those programs which are available for recording using the inventive VDVR service. A second program list, denoted 505, identifies those programs which have been recorded or requested to be recorded using the inventive VDVR service. Thus, program list 505 in this instance includes identifiers of aforementioned programs 441 and 443. It should be noted that the program identifiers in each of lists 501 and 505 may be organized or grouped by program channels, broadcast times, titles, program types, actors, directors, and/or other genres. In fact, the user in this instance is afforded the capability of reorganizing the program identifiers in each list in whatever order and/or genres preferred by the user.

In addition, the user in this instance is afforded the capability of traversing each list to select or deselect individual programs identified therein. For example, the user may select one or more programs in list 501 to record the same. The identifiers of the corresponding programs are then moved from list 501 to list 505. Conversely, the user may deselect to-be-recorded programs in list 505 to obliterate their recording status. The identifiers of the deselected programs, available for recording again, may then be moved to list 501.

Figure 6:
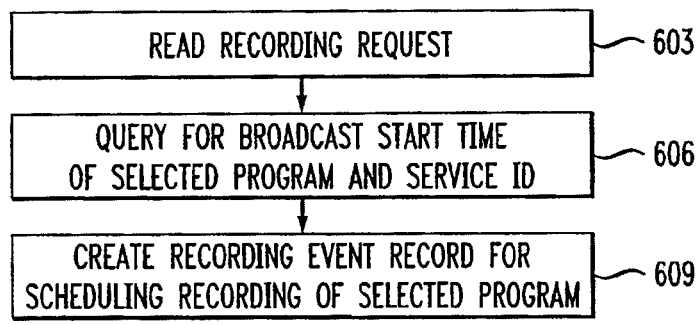
FIG. 6 is a flow chart illustrating steps for processing a request for recording a program from a set-top terminal in accordance with the invention.
Figure 7:
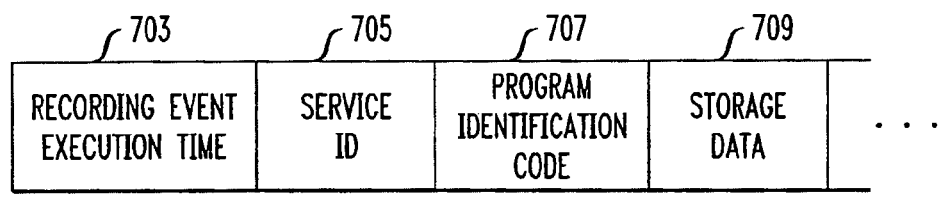
FIG. 7 illustrates a recording event record for scheduling recording of a requested program in accordance with the invention.

When a user at, say, terminal 138-1 uses, say, IPG 400, to select a program to be recorded, terminal 138-1, generates a recording request to VDVR server 118 identified by its IP address. This request includes a recording command, the program identification code identifying the selected program, and MAC address 212 of terminal 138-1. After receiving such a recording request, server 118 reads the request, as indicated at step 603 in FIG. 6. Server 118 at step 606 queries scheduler 107, containing the aforementioned EPG data, for (1) the broadcast start time and (2) service ID identifying the content provider, e.g., HBO, CBS, ABC, etc.) of the selected program, identified by the program identification code in the recording request. Server 118 at step 609 creates a recording event record in an event schedule database (not shown) for scheduling recording of the selected program. This recording event record, denoted 700 in FIG. 7, includes, among others, the recording event execution time in field 703, i.e., the broadcast start time of the selected program; the service ID in field 705; the program identification code from the recording request in field 707; and data in field 709 specifying storage space 252 where the recorded program is to be stored, which is associated with MAC address 212 from the recording request, in accordance with memory map 200.

Server 118 monitors for the recording event execution time in each record in the event schedule database. For example, when the recording event execution time in field 703 of record 700 is up, server 118 locates, from the aforementioned transport streams, the programming content provided by the content provider identified by the service ID in field 705. As mentioned before, these transport streams are fed from broadcast subsystem 112 to server 118. Server 118 starts copying the programming content as soon as it is located, which corresponds to the program selected by the user. The resulting copy of the selected program is stored in storage space 252 as specified in field 709. In this instance, the copy of the selected program is indexed in storage space 252 using the program identification code in field 707. Thus, based on such a program identification code and MAC address 212, the stored copy of the selected program is retrievable from storage 116, where MAC address 212 identifies storage space 252 associated therewith, and the program identification code identifies the stored copy within space 252.

It should be noted at this point that server 118 in accordance with the invention is capable of multitasking and can execute multiple recording events concurrently. Unlike a prior art DVR limited by the number of tuners therein, server 118 is capable of recording as many programs in their entirety having overlapping broadcast times as the user desires.

It should also be noted that the present VDVR service allows a user to record a virtually unlimited number of programs in the storage space associated with the user terminal, which may be ever-expanding, although the user may be required to pay a fee which may vary with the amount of storage space additionally allocated to the user.

For those programs which were broadcast and recorded (e.g., program 441), the user may select one such program in IPG 400 or list 505 (marked by "^" in list 505) and start reviewing it by pressing a "play" key on the remote control. In response, terminal 158-1 formats a program review request including, among others, a review command, a program identification code identifying the recorded program to be played, MAC address 212 of terminal 158-1 and a network address of controller 119 to which the request is destined. Terminal 158-1 then transmits the resulting request to headend 110 through an RDC, which is routed to controller 119.

Upon receiving the program review request, controller 119 in a conventional manner identifies a carrier, say $C_1$, for carrying a transport stream destined to the neighborhood of terminal 158-1. It should be noted that each carrier in system 100 is associated with a different one of the transmission channels in the forward passband. In addition, each transport stream is identified by a different transport stream identification (TSID) in system 100. Controller 119 causes VDVR server 118 to retrieve the program copy requested by the user from storage 116, based on MAC address 212 in the request which identifies storage space 252, and the program identification code in the request which identifies the requested program copy within space 252. Server 181 then generates a program stream containing the requested program material. Such a program stream, identifiable by a program ID (PID), may be multiplexed with other program streams in the transport stream. Server 118 causes switching unit 114 to switch the transport stream to an appropriate modulator in modulator bank 123 where the transport stream is modulated onto the identified carrier, i.e., $C_1$ in this instance. The modulated carrier traverses the transmission channel associated therewith in HFC cable network 140.

In response to the received program review request, network controller 119 communicates to terminal 158-1 (at MAC address 212 which may be translated to its IP address) via an FDC a message concerning the carrier frequency to which terminal 158-1 should tune to receive the appropriate transport stream, and the PID for extracting the desired program stream identified thereby from the transport stream. Accordingly, relying on the information in such a message, terminal 158-1 obtains the desired program stream. In a well known manner, terminal 158-1 converts the program stream to appropriate signals for the associated TV to display the recorded program as requested.

Like a prior art DVR, VDVR server 118 also automatically records the last X minutes of programming content played on the program channel to which terminal 158-1 actually tunes, where X represents a predetermined value. To that end, VDVR 118 is informed of any program channel change event, including the event of turning on the TV (which is a special case of a program channel change event). In this instance, when the user at terminal 158-1 turns on the TV or changes to a new program channel, terminal 158-1 generates a program channel change message for transmission to VDVR 118. This message includes, among others, MAC address 212 identifying set-top terminal 158-1, and service ID corresponding to the new program channel to which terminal 158-1 has tuned. Terminal 158 may look up such a service ID in a table associating different program channel numbers (e.g., 2, 14 and 32) with the corresponding service IDs (e.g., CBS, ESPN and MTV). Upon receiving such a program channel change message, server 118 locates from the aforementioned transport streams the in-progress programming content provided by the content provider, identified by the service ID in the received message. Server 118 then starts storing such programming content in a buffer in storage space 252 associated with MAC address 212, in accordance with memory map 200. Such a buffer is configured to store last X minutes' worth of programming content and overwrite any stored content therein that is older than X minutes.

It should be noted that where a switched broadcast service is deployed, the VDVR service can be implemented synergistically. According to the switched broadcast service, selected program channels are made available to users in the same service area on an as needed basis. As a result, the number of program channels furnished, although not simultaneously, by the switched broadcast service may exceed the maximum number of carriers allowed. For details on the switched broadcast service, one may refer to copending, commonly assigned U.S. application Ser. No. 09/956,688 filed on Sep. 20, 2001 and published on Mar. 20, 2003 bearing U.S. Patent Publication No. 2003/0056217 A1, hereby incorporated by reference. Like the VDVR service, the switched broadcast service requires each set-top terminal to send program channel change messages described above to the headend facility for processing. While the VDVR service relies on the program channel change messages to track which program channel a user is watching, the switched broadcast service relies on the same messages to track which program channel no user is watching. Advantageously, an implementation of the VDVR service in a switched broadcast service area requires virtually no additional resources as far as generation and processing of the program channel change messages are concerned.

Like a prior art DVR, VDVR server 118 scans the stored content in storage space 212 to play back recorded programming content to the user. Also like a prior art DVR, Server 118 is receptive to rewind, pause and fast-forward commands issued by the user through terminal 158-1. For example, upon receiving a rewind command through an RDC, server 181 scans the stored program content backward and skips some details thereof to achieve the desired rewind effect. Upon receiving a pause command through an RDC, server 181 temporarily stops scanning the stored content, thereby transmitting a static picture to terminal 158-1. Upon receiving a fast-forward command through an RDC, server 181 scans the stored program content forward and skips some details thereof to achieve the desired fast-forward effect. Alternatively, the rewind, pause and fast-forward effects may be achieved using other prior art techniques, including, e.g., one using trick files containing references to I-frames of an MPEG encoded program stream.

The foregoing merely illustrates the principles of the invention. It will thus be appreciated that those skilled in the art will be able to devise numerous other arrangements which embody the principles of the invention and are thus within its spirit and scope.

For example, server 118 may also be programmed to track a user's viewing habit and generate a profile including the user's preferences in terms of program types, actors and/or other genres. According to such a user profile, server 118 may suggest that the user record certain programs to be broadcast, or may automatically record those programs anyhow.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A system to provide programming content to users of a network, comprising:
   a first interface configured to:
      receive programming content;
   a storage device comprising:
      at least one respective storage location assigned exclusively to each of a plurality of users, the storage device being located remotely from premises of the respective users; and
   at least one processor configured to:
      cause at least some of the received programming content to be stored in one of the at least one respective storage locations assigned to a user;
      retrieve at least some of the stored programming content from the at least one storage location; and
      provide the retrieved programming content to a user device, via a network.

2. The system of claim 1, further comprising:
   a second interface configured to:
      receive from the user a request to store the at least some of the programming content;
   wherein the at least one processor is configured to:
      cause the requested programming content to be stored in the respective storage location.

3. The system of claim 1, wherein:
   the network includes a cable TV network.

4. The system of claim 1, wherein the processor is configured to:
   cause storage of programming content selected by a user, via a program guide.

5. The system of claim 1, wherein:
   the at least some of the retrieved programming content is provided after broadcast thereof in a presentation manipulable to perform at least one of rewinding, pausing and fast-forwarding on the presentation.

6. The system of claim 1, further comprising:
   a second interface configured to:
      receive data concerning a channel to which a respective user device is tuned;
   wherein the at least one processor is configured to:
      cause at least a portion of the programming content on the channel to which the respective user device is tuned to be stored in the respective storage location, during the broadcast thereof.

7. The system of claim 1, wherein:
   a user is charged a fee based at least in part on an amount of memory space in the at least one storage location assigned to the user.

8. The system of claim 1, wherein the first interface is configured to receive the programming content, at least in part, during a broadcast thereof.

9. The system of claim 1, wherein the at least one respective storage location is assigned exclusively to respective users.

10. The system of claim 1, wherein the at least one processor is part of a headend of a cable television network.

11. The system of claim 2, wherein the at least one processor is further configured to:
    track requests to store by respective users.

12. The system of claim 11, wherein the at least one processor is further configured to recommend to a user that selected programming content be recorded based, at least in part, on the tracking.

13. A method to provide programming content to users of a network, comprising:
    receiving programming content;
    storing at least some of the received programming content in at least one storage location assigned exclusively to one of a plurality of users, the at least one storage location being located remotely from the user's premises, wherein the storage defines a plurality of respective storage locations, each assigned exclusively to a respective user;
    retrieving at least some of the stored programming content from the at least one storage location; and
    providing the retrieved programming content to a user device via a network.

14. The method of claim 13, further comprising:
    receiving from the user a request to store the at least some of the programming content; and
    storing the requested programming content in the at least one storage location.

15. The method of claim 14, comprising:
    receiving the request to store the at least some of the programming content, via a program guide.

16. The method of claim 13, further comprising:
    providing at least some of the retrieved programming content after broadcast thereof in a presentation manipulable to perform at least one of rewinding, pausing and fast-forwarding on the presentation.

17. The method of claim 14, comprising:
    receiving from the user a request to store programming content on a channel to which the user device is tuned; and storing at least a portion of the programming content on the channel during the broadcast thereof in the at least one storage location.

18. The method of claim 13, further comprising:
charging a user a fee based at least in part on an amount of memory space in the at least one storage location assigned to the user.

19. The method of claim 13, comprising receiving, storing, retrieving, and providing, at least in part, by at least one processor in a headend of a cable television network.

20. The method of claim 14, further comprising tracking requests to store by respective users.

21. The method of claim 20, further comprising recommending to a user that selected programming content be recorded based, at least in part, on the tracking.

22. The method of claim 13, comprising storing the at least some of the received programming content during broadcast thereof.

23. The method of claim 13, comprising storing the at least some of the programming content in at least one storage location assigned exclusively to a respective user.

24. The system of claim 2, wherein:
the second interface is configured to receive the request before the selected programming content is broadcast; and
the at least one processor is configured to cause the requested programming content to be stored in the at least one respective storage location while the requested programming content is broadcast.

25. The method of claim 14 comprising:
receiving the request before the selected programming content is broadcast.

26. A method for use in a communications system for providing programming content through a communications network, the method comprising:
receiving from a user a request to record selected programming content, the request being received through the communications network;
in response to the request, copying the selected programming content during broadcast of the selected programming content through the communications network;
storing a copy of the selected programming content in a storage space in storage associated with the user, the storage defining a plurality of storage spaces; and
providing the selected programming content to a user device through the communications network after broadcast thereof;
wherein the storage is remote from the user's premises.

27. The method of claim 26, wherein the delivery network includes a cable TV network.

28. The method of claim 26, comprising receiving the request via a program guide.

29. The method of claim 26, comprising providing the selected programming content after broadcast thereof in a presentation manipulable to perform at least one of rewinding, pausing and fast-forwarding on the presentation.

30. The method of claim 26 comprising providing the selected programming content in response to a request to provide the stored programming content by the user.

31. A communications system for providing programming content through a communications network, the system comprising:
an interface configured to:
receive a request to copy programming content from a user, the request being received through the communications network;
a storage device remote from premises of respective users, the storage device comprising storage spaces associated with respective users;
at least one processor configured to:
copy selected programming content during broadcast of the selected programming content through the communications network, in response to a request from a respective user;
cause a copy of the selected programming content to be stored in a storage space associated with the user; and
provide the selected programming content through the communications network to a user device.

32. The system according to claim 31, wherein the copy of the selected programming content is stored when the selected programming content is broadcast.

33. The system according to claim 32, wherein the time the selected programming content is broadcast is determined according to a broadcast schedule.

34. The system according to claim 31, wherein the selected programming content is selected via a program guide.

35. The system according to claim 31, wherein the selected programming content is provided based on the copy thereof in a presentation manipulable to perform at least one of rewinding, pausing and fast-forwarding on the presentation.

36. The system according to claim 31, wherein the network includes a cable TV network.

37. The system of claim 31, wherein
the interface is configured to receive through the communications network, data concerning a channel to which a user device is tuned; and
the at least one processing device is configured to copy and store programming content during broadcast thereof on the channel to which a user device is tuned.

38. The system of claim 31, wherein the at least one processor is configured to:
receive a request by the user to provide the selected programming content; and
provide the selected programming content to the user device in response to the request.

39. A system to provide programming content to users of a network, comprising:
a first interface configured to:
receive programming content, at least in part, during a broadcast thereof;
a storage device comprising at least one respective storage location assigned to a respective subscriber located remotely from the storage device; and
at least one processor configured to:
cause at least some of the received programming content to be stored in a storage location associated with the respective subscriber, at least in part during the broadcast of the programming content;
retrieve at least some of the stored programming content from the at least one storage location; and
provide the retrieved programming content to a subscriber device of the respective subscriber, via a network.

40. The system of claim 39, further comprising:
a second interface configured to:
receive from a subscriber a request to store the at least some of the programming content;
wherein the at least one processor is configured to:
cause the requested programming content to be stored in the storage location associated with the subscriber.

41. The system of claim 39, wherein the network includes a cable TV network.

42. The system of claim 39, wherein the processor is configured to:
cause storage of programming content selected by a subscriber via a program guide.

43. The system of claim 39, wherein:
the at least some of the retrieved programming content is provided after broadcast thereof in a presentation manipulable to perform at least one of rewinding, pausing and fast-forwarding on the presentation.

44. The system of claim 39, further comprising:
a second interface configured to:
receive data concerning a channel to which the subscriber device is tuned;
wherein the at least one processor is configured to:
cause at least a portion of the programming content on the channel to which the subscriber is tuned to be stored in the respective storage location, during the broadcast thereof.

45. The system of claim 39, wherein:
a subscriber associated with the subscriber device is charged a fee based at least in part on an amount of memory space in the at least one storage location assigned to the subscriber.

46. The system of claim 39 wherein at least one processor is configured to:
receive a request from a subscriber to provide the stored programming content; and
retrieve the stored programming content and provide the retrieved programming content in response to the request.

47. A method to provide programming content to users of a network, comprising:
receiving programming content, at least in part, during a broadcast thereof;
storing at least some of the received programming content in at least one storage location assigned to a subscriber, the storage location being located remotely from the storage device, at least in part during the broadcast thereof, wherein the storage device defines a plurality of respective storage locations assigned to respective subscribers;
retrieving at least some of the stored programming content from the at least one storage location; and
providing the retrieved programming content via the network to the subscriber via a subscriber device.

48. The method of claim 47, further comprising:
receiving from the subscriber device a request to store the at least some of the programming content; and
storing the requested programming content in the at least one storage location.

49. The method of claim 48, wherein:
the network includes a cable TV network.

50. The method of claim 48, comprising:
receiving the request to store that at least some of the programming content, via a program guide.

51. The method of claim 48, further comprising:
providing at least some of the retrieved programming content after broadcast thereof in a presentation manipulable to perform at least one of rewinding, pausing and fast-forwarding on the presentation.

52. The method of claim 48 comprising:
receiving from the subscriber device a request to store programming content on a channel to which the subscriber device is tuned; and
storing at least a portion of the programming content on the channel during the broadcast thereof in the at least one storage location.

53. The method of claim 48, further comprising:
charging a user associated with the user device a fee based at least in part on an amount of memory space in the at least one storage location assigned to the subscriber.

54. The method of claim 47, further comprising:
receiving a request to provide the stored programming content by a subscriber;
retrieving the stored program content; and
providing the retrieved programming content to a subscriber device, in response to the request.

* * * * *